(12) United States Patent
Wang et al.

(10) Patent No.: US 8,988,978 B2
(45) Date of Patent: Mar. 24, 2015

(54) SYSTEM AND METHOD FOR IMPROVED CONNECTIVITY IN GPRS/EGPRS MOBILE ENVIRONMENT FOR STREAMING SERVICE

(71) Applicant: Apple Inc., Cupertino, CA (US)

(72) Inventors: Yu-lin Wang, Cupertino, CA (US); Johnson O. Sebeni, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 57 days.

(21) Appl. No.: 13/776,399

(22) Filed: Feb. 25, 2013

(65) Prior Publication Data

US 2014/0241177 A1    Aug. 28, 2014

(51) Int. Cl.
- *H04J 9/00* (2006.01)
- *H04L 5/04* (2006.01)
- *H04W 24/02* (2009.01)

(52) U.S. Cl.
CPC ..................................... *H04W 24/02* (2013.01)
USPC ........... 370/204; 370/252; 375/141; 375/146; 375/147

(58) Field of Classification Search
USPC ............. 370/204, 252, 253; 375/240.05, 358, 375/135, 136, 141, 146, 147
See application file for complete search history.

(56) References Cited

U.S. PATENT DOCUMENTS

| | | | |
|---|---|---|---|
| 7,016,670 B2 | 3/2006 | Agin | |
| 7,983,620 B2 | 7/2011 | Itoh et al. | |
| 8,037,373 B2 | 10/2011 | Leung et al. | |
| 8,358,615 B2 | 1/2013 | Ali et al. | |
| 2010/0185918 A1* | 7/2010 | Ashkenazi et al. | 714/752 |
| 2012/0135778 A1* | 5/2012 | Tian | 455/522 |
| 2013/0028307 A1* | 1/2013 | Ren et al. | 375/224 |
| 2013/0163430 A1* | 6/2013 | Gell et al. | 370/235 |

\* cited by examiner

*Primary Examiner* — Benjamin H Elliott, IV

(74) *Attorney, Agent, or Firm* — Kenyon & Kenyon LLP

(57) ABSTRACT

A system and method to select a modulation coding scheme of a mobile device including establishing a connection between the mobile device and a remote device through a wireless communication network, monitoring at least two measured properties of a radio frequency access link between the mobile device and the wireless communication network, selecting an updated derived C value based on the measured properties of the radio frequency access link, and inducing a change in a modulation coding scheme based on the updated derived C value.

19 Claims, 5 Drawing Sheets

FIG. 5

| BCCH RSSI | PDCH SNR | Derived C |
|---|---|---|
| High | High | C00 |
| High | Low | C01 |
| Low | High | C02 |
| Low | Low | C03 |

500

SYSTEM AND METHOD FOR IMPROVED CONNECTIVITY IN GPRS/EGPRS MOBILE ENVIRONMENT FOR STREAMING SERVICE

BACKGROUND OF THE INVENTION

1. Field of the Invention

The present invention relates to streaming content, and more importantly, to obtaining a modulation coding scheme that maintains streaming content.

2. Discussion of the Related Art

Mobile wireless communication devices, such as cellular telephones, tablet computers, and notebook computers, support a variety of communication services including, for example, voice communication, text messaging, Internet browsing, and audio/video streaming. To support these services, wireless communication networks use one or more standardized communication protocols, such as the Global System for Mobile Communications (GSM) and the Universal Mobile Telecommunication System (UMTS). Additional protocols support data services, such as general packet radio service (GPRS) or enhanced GPRS (EGPRS). Each of these standardized communication protocols specify access techniques that permit the simultaneous service of multiple mobile devices by a wireless communication network.

Users of mobile devices expect good performance for both voice and data services under a variety of operating scenarios including, for example, dense urban areas, rural expanses, and indoor locations. Each operating scenario presents a different combination of effects on radio frequency signals transmitted between the mobile wireless communication device and base transceiver stations (BTS) located within cells of a wireless communication network. To measure performance, communication protocols often define several indicators to measure performance of communication devices or channels.

The connection between a mobile device and a remote device can traverse both wireless and wired segments. Wireless access segments can use one or more of many different wireless access technologies. An application service in the mobile device can adapt to variations in conditions through the communication network connection based on far end feedback from the remote device; however, this far end feedback can incur significant delay before reaching the mobile device, thereby limiting the speed with which the application service can respond to changing network conditions.

In addition, each voice and data application can have different service requirements for operating characteristics, such as performance parameters for delay latency, packet loss, and jitter tolerance. Among the various applications, streaming content and live streaming content can have the strictest performance requirements. For example, real time conversational voice connections and high quality video conferencing services require higher data rates with lower delay than non-real time services. Satisfying end-to-end quality of service (QoS) for an application can prove difficult, as packets can traverse through multiple independent nodes between the mobile device and a destination end point. In a wireless access network portion of a connection, limited radio frequency bandwidth can be shared by multiple users, and the transmission capabilities of the wireless access network portion can change dynamically over time.

Moreover, due to the growing use of 3G networks, bandwidth available for GSM/GPRS is shrinking As a result, problems caused by interference, especially co-channel interference, have increased. Although higher modulation coding schemes (MCS) can be used to produce higher throughput, they are also more vulnerable to interference and noise. With increased interference, demodulation performance becomes seriously limited even when a high received signal strength indicator (RSSI) is measured. Within this transmission environment, the transmission channels used for streaming content can be jeopardized.

At present, a standardized method for a BTS to select an MCS has not yet been adopted. Among the metrics that can be used for the network equipment to select the MCS is the mobile device reported "Derived C." In general, the Derived C data represents a filtered strength of the serving cell broadcast control channel (BCCH). Unfortunately, present Derived C value calculations frequently do not provide an accurate assessment of the communication channel. Thus, there exists a need to provide an MCS that sufficiently maintains streaming data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 5 illustrates an example Derived C value lookup table used for selecting an MCS for an application in a mobile device according to an example embodiment of the present invention.

DETAILED DESCRIPTION OF THE INVENTION

Figure 1:
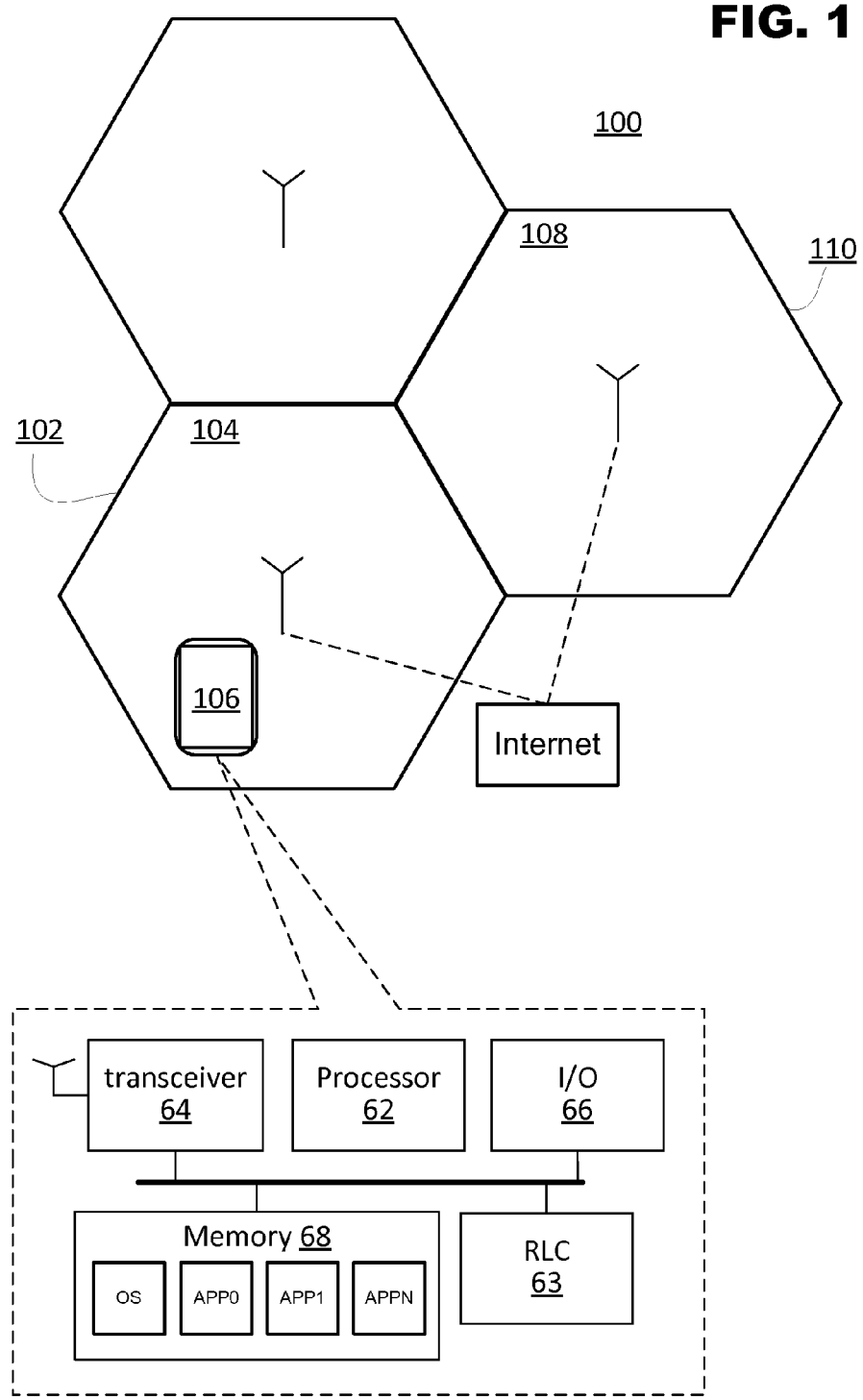
FIG. 1 illustrates an example wireless communication network having a plurality of overlapping cells to which a mobile wireless communication device can connect according to an example embodiment of the present invention.

Embodiments of the present invention provide a system and/or method for improved connectivity in the GPRS/EGPRS mobile environment for a video steaming application. To achieve advantages in accordance with the purpose of the present invention, as embodied and broadly described, an aspect provides a method to select a modulation coding scheme of a mobile device including establishing a connection between the mobile device and a remote device through a wireless communication network, monitoring at least two measured properties of a radio frequency access link between the mobile device and the wireless communication network, selecting an updated derived C value based on the measured properties of the radio frequency access link, and inducing a change in a modulation coding scheme based on the updated derived C value.

Another aspect provides a mobile device including a transceiver that monitors at least two measured properties of a radio frequency access link between the mobile device and the wireless communication network, and an application processor that receives the measured properties of a radio frequency access link, provides an updated derived C value based on the measured properties of the radio frequency access link, and instructs the transceiver to transmit the updated derived C value to a base station to induce a change in a modulation coding scheme.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements. It is to be understood that the following detailed description is exemplary and explanatory and intended to provide further explanation of the invention as claimed.

Embodiments of communication protocols and associated methods for using a mobile device are described. In some embodiments, the device may be a mobile wireless communication device (e.g., a mobile phone or tablet). The mobile device may include a user interface such as a touch screen and/or other input/output devices. In the discussion that follows, a mobile device is used as an example embodiment. It should be understood, however, that the communication protocols and associated methods may be applied to other devices, such as personal computers and laptops, that may include one or more other communication devices for local and wide area communications.

The mobile device may support a variety of applications, such as telephone, text messenger, Internet browsing, e-mail, gaming, audio/video streaming and other applications. The various applications that may be executed on the mobile device may use at least one common physical user-interface device, such as a touch screen. In this way, a common physical architecture of the device may support a variety of applications with user interfaces that are intuitive and transparent. In the discussion that follows, video streaming applications are used as an example embodiment, but it should be understood that the communication protocols and associated methods may be applied to other applications.

Different applications that access different services across a communication link may require different quality of service (QoS) properties to operate properly. Packets generated by each application can be treated differently rather than identically when transported through the communication link. Different applications can require that packets have different amounts of delay, jitter, loss rates, and throughput. Some applications can be more sensitive to time delays, such as conversational voice, video conferencing, and interactive gaming. Other applications may require guaranteed arrival of the packets with no packet loss for a highly reliable connection such as when securely downloading data files.

The access portion of communication networks, particularly wireless radio access links, share limited bandwidth of available resources among many users simultaneously, and each user often desires to use multiple applications. Mobile devices can provide an application service that can be transported through many different types of connections, and a user can expect similar performance from the application service independent of the connection over which packets are transmitted.

FIG. 1 illustrates an example wireless communication network 100 having a plurality of overlapping cells to which a mobile wireless communication device 106 can connect.

The wireless communication network 100 can operate according to one or more different communication protocols, such as a GSM, UMTS, or Long Term Evolution (LTE). The discussion herein focuses on GSM/GPRS, but the same ideas apply to other wireless access network technologies.

Each cell of the wireless communication network 100 corresponds to a geographic area extending from a centralized radio network subsystem (RNS). Mobile wireless communication devices 106 can include mobile phones, "smart" phones, and mobile computing devices with wireless connectivity. A mobile device 106 can receive communication signals from a number of different cells in the wireless communication network 100, each cell located at a different distance from the mobile device 106. The mobile device 106 can be connected to a radio network subsystem 104 in a serving cell 102 and can be aware of neighbor cells in the wireless communication network 100, such as radio network subsystem 108 in neighbor cell 110. Each radio network subsystem may be connected to a packet data network, such as Internet.

The radio resources that connect the mobile device 106 to a cell can be limited and shared among multiple mobile wireless communication devices. In addition, the mobile device 106 can support multiple parallel data flows to the radio network subsystem 104 that can each provide different QoS characteristics. Packets originating at the mobile device 106 from different applications can be mapped to different data flows based on each application's QoS requirements.

Mobile device 106 includes several components interconnected by a bus or other standard or proprietary communication device. The components may include a transceiver 64, processor 62, input/output devices 66 (e.g., touch screen, keypad, microphone, speakers, etc.), and memory 68. Memory 68 stores the operating system OS of the mobile device 106 as well as one or more applications (APP0, APP1, . . . APPN). Included among the applications may be a streaming application service. Mobile device 106 also includes a radio link controller 63 that is responsible for controlling the transmission of packet data and managing different QoS requirements of the various applications.

Some applications may employ a temporary block flow (TBF) to support transmission of packet data between mobile device 106 and the base station of serving cell 102. A TBF is a connection between a mobile device and a base station that enables the exchange of packet data. In other words, a TBF is a connection between two medium access control (MAC) entities that supports the transfer of a radio link control (RLC) protocol data unit (PDU) on one or more channels or subchannels. One or more TBFs is provided when packets are transferred. When packets are transferred, one or more packet data channels (PDCHs) are assigned to the mobile device. When data transmission is completed, or when a link is lost, the TBF is released.

Using one or more TBFs, an application service connection, such as video streaming connection, can be established between the mobile device 106 and a remote device (not shown). During the connection, the mobile device 106 can monitor one or more real time properties of a radio frequency link between the mobile device 106 and a wireless communication network 100. For example, the mobile device 106 can measure the RSSI of the BCCH and/or signal-noise-ratio (SNR) observed in the PDCHs. Here, the mobile device 106 may determine the Derived C based upon the RSSI of the BCCH as well as the SNR of a traffic burst. The Derived C can be transmitted to the base station where it can be used to select an appropriate MCS. The resulting Derived C or selected MCS can then be transmitted to the wireless communication network 100.

Figure 2:
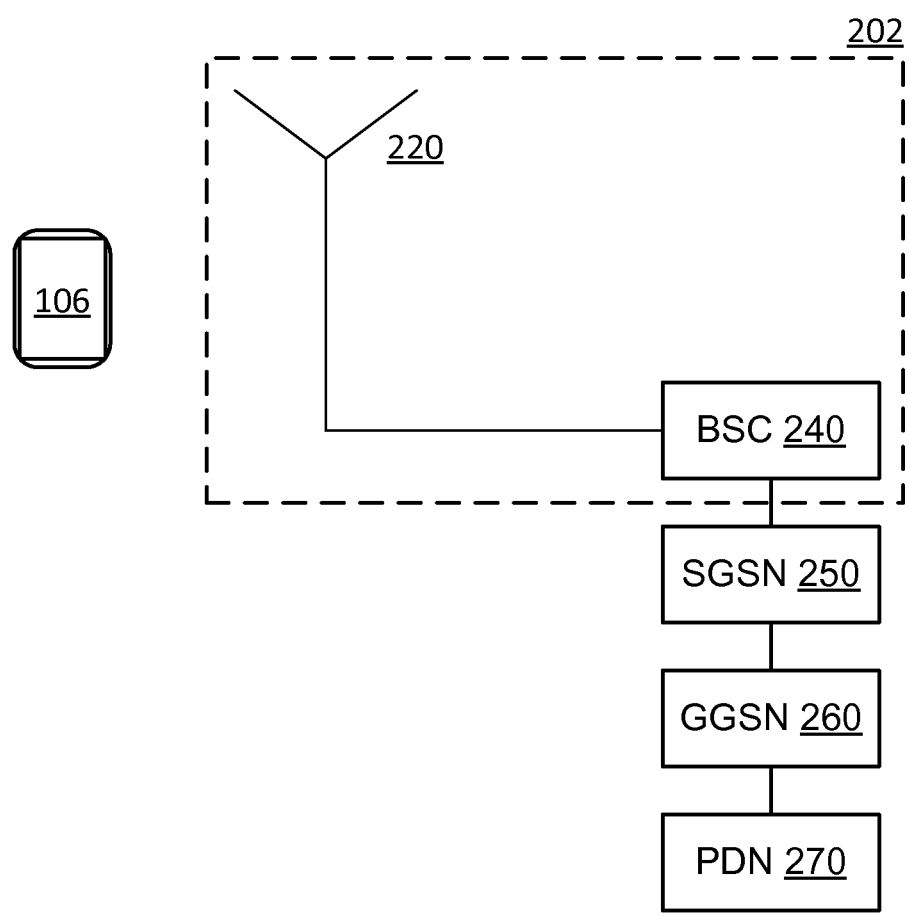
FIG. 2 is an example system diagram illustrating a connection of a mobile device to a packet data network according to an example embodiment of the present invention.

FIG. 2 is an example system diagram illustrating a connection of a mobile device to a packet data network according to an example embodiment of the present invention.

As shown in FIG. 2, the wireless communication network may include a base station 202 including a base station transceiver (BTS) 220 coupled to a base station controller (BSC) 240. Each cell within the wireless network can include at least one BTS 220 that communicates with each mobile device within the cell through a radio interface. The BSC 240 is coupled to serving GPRS support node (SGSN) 250 that manages the mobility of mobile devices within the cell and neighboring cells. The SGSN 250 also interfaces with gateway GPRS support node (GGSN) 260 that routes data packets of mobile devices 106 with an external packet data network (PDN) 270, such as the Internet. Mobile device 106 can exchange packet data with remote devices that are also coupled to PDN 270.

Figure 3:
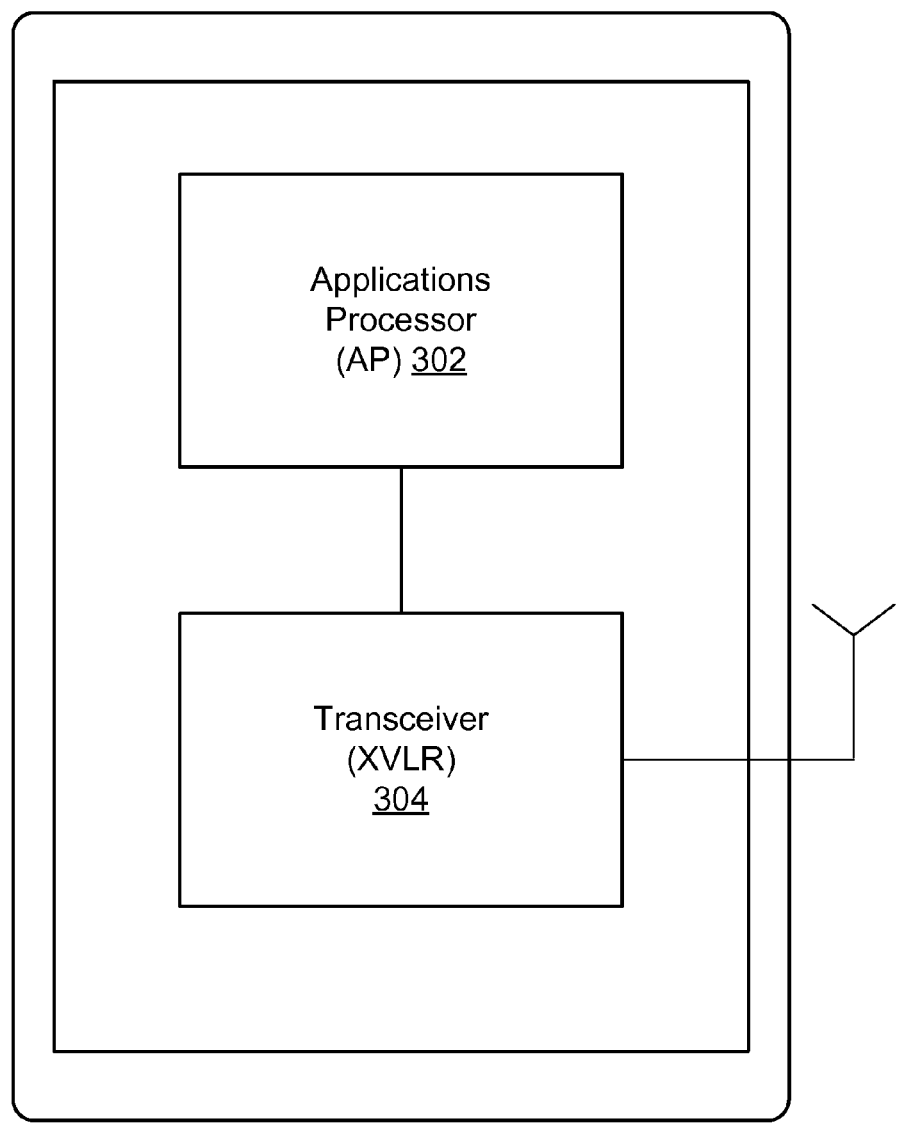
FIG. 3 illustrates an example mobile wireless communication device according to an example embodiment of the present invention.

FIG. 3 illustrates an example mobile wireless communication device according to an example embodiment of the present invention.

As shown in FIG. 3, a mobile device 106 may include an applications processor (AP) 302 that can perform higher layer functions, such as maintaining an IP stack and requesting and releasing data connections. The AP 302 can also generate IP packets (also known as datagrams) and transfer them to a baseband transceiver (XCVR) 304 for processing into lower layer packets, also called protocol data units (PDUs). The lower layer PDUs can be formatted appropriately for transmission over a wireless connection. The XCVR 304 in the mobile wireless communication device 106 can transmit and receive lower layer packets that correspond to higher layer signaling and data packets through a radio "air" interface to the RNS 104 in the wireless communication network 100.

In an example embodiment, XCVR 304 monitors and measures one or more properties of a radio frequency access link between the mobile device 106 and the wireless communication network 100. For example, XCVR 304 can measure the RSSI of the BCCH and/or the SNR of a traffic channel. AP 302 can receive the measured properties of a radio frequency access link. Using the measured properties, AP 302 can also provide an updated Derived C value and adjust the MCS. XCVR 304 can then transmit the resulting Derived C or selected MCS to the wireless communication network 100.

The AP 302 and XCVR 304 can be both contained within the mobile device 106. Alternatively, a XCVR 304 can be externally attached to a mobile computing device (not shown) to provide similar wireless connectivity and thereby together form a mobile wireless device. The interface between the AP 302 and the XCVR 304 can be a proprietary interface or a standardized interface.

Figure 4:
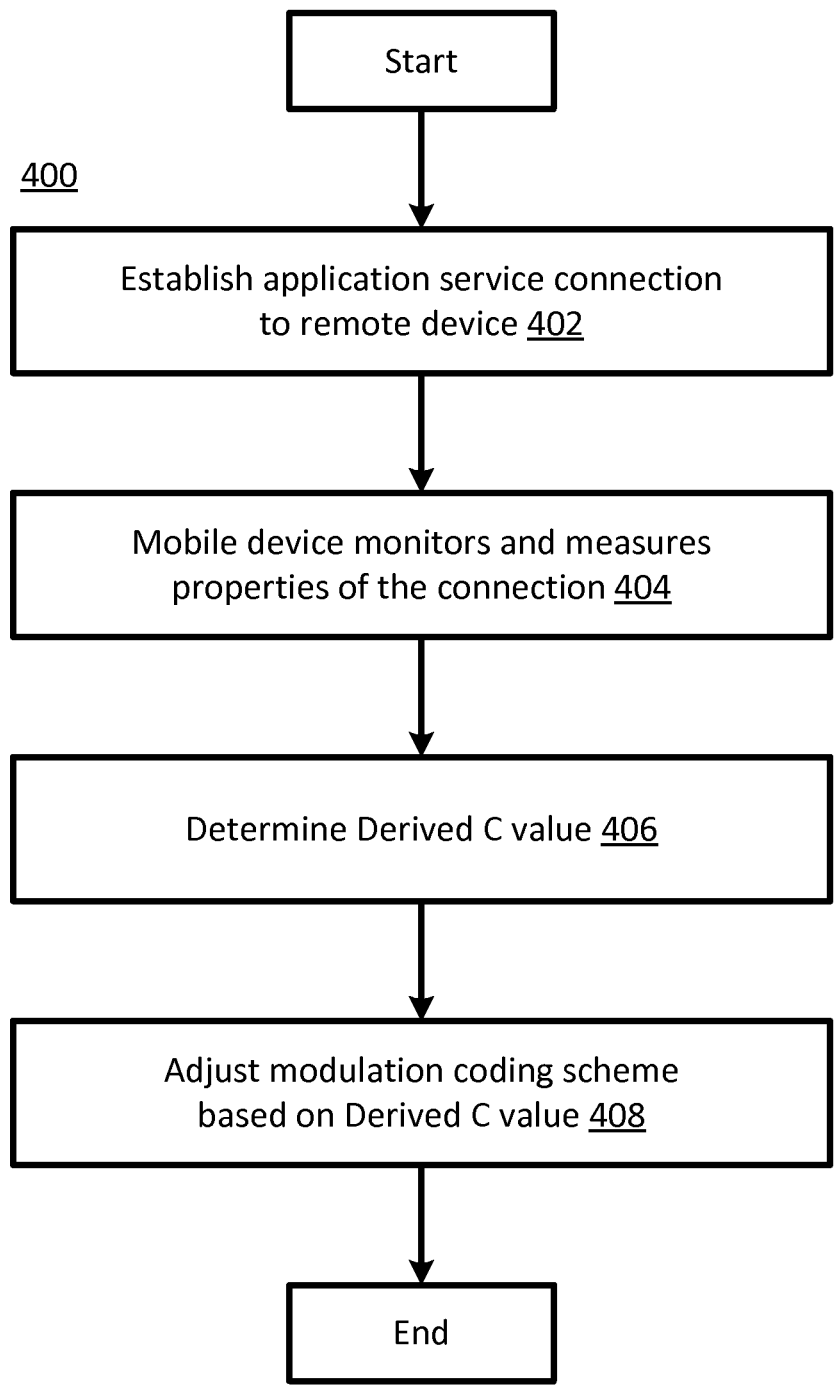
FIG. 4 illustrates an example method for updating an MCS for an application in a mobile device according to an example embodiment of the present invention.

FIG. 4 illustrates an example method 400 for updating an MCS for an application in a mobile device 106 according to an example embodiment of the present invention.

First, at step 402, an application service connection can be established between the mobile device 106 and a remote device. The example application service can include simultaneous transfer of audio and video packet data.

Next, at step 404, the mobile device 106 can monitor one or more real time properties of a radio frequency link between the mobile device 106 and a wireless communication network 100. For example, the RSSI of the BCCH and/or SNR of a traffic channel can be measured by the mobile device 106. Of course, other measurements may also be made, such as the effective data transfer rate associated with the application service connection, or the queue level associated with transporting data packets for the application service.

At step 406, values of the monitored properties of the radio frequency link can be provided to a processing unit in the mobile device 106. One or more real time properties can be monitored by a transceiver unit (e.g., XCVR 304) and provided to an application processing unit (e.g., AP 302) that can generate data packets for the application service connection. In particular, an embodiment of the present invention calculates the Derived C based not only upon the serving cell BCCH, but is also based upon the SNR of a PDCH. In other words, the mobile device 106 uses the measured strength of the BCCH as well as the errors reflected in the traffic channel (i.e., SNR) to calculated the Derived C.

Alternatively, an update to the derived C can be triggered by communication errors. For example, if communication errors are detected (e.g., high number of lost or corrupted data packets, or a high SNR in the data channel), the streaming application may cause the Derived C value to be updated so as to select an MCS that has better demodulation performance. In this example, the SNR or another error measurement may be compared to a threshold to determine whether an update to the Derived C will be invoked.

Lastly, at step 408, the calculated Derived C value can be used to select an appropriate MCS. In an example embodiment, the MCS can be adjusted using a C value lookup table that contains Derived C values for a plurality of RSSI and SNR combinations. For example, in a high RSSI and low SNR condition, the mobile device 106 may report a worse Derived C to have a lower MCS assigned by the network. A lower MCS implies a better demodulation performance for a given radio condition. In this example and other situations in which a lower MCS is selected, the streaming application may also request/negotiate a lower grade of service from the streaming server.

Accordingly, embodiments of the present invention improve connectivity in the GPRS/EGPRS mobile environment for a video steaming application. The mobile device 106 may have a better chance to maintain the radio link without resulting in a TBF release. As a result, a better user experience can be achieved.

FIG. 5 illustrates an example Derived C value lookup table 500 for selecting an MCS for an application in a mobile device 106 according to an example embodiment of the present invention. As shown in FIG. 5, different derived C values (e.g., C00, C01, C02, C03) are provided depending upon the combination of BCCH RSSI and traffic channel SNR.

Alternatively, the Derived C value can be calculated instead of using a look-up table. In one example, the Derived C value can be calculated according to communication protocols, such as the C value calculation specified in 3GPP TS 45.008 section 10.2.3.1. In another example, the C value specified in a communication protocol can be applied in combination with a bias function (f_bias) which can use one or more of the current traffic burst SNR, cyclic redundancy check (CRC) status, and streaming service type (e.g., music, video, teleconference, etc.) as inputs. In this example, the Derived C can be calculated as Derived C=C_Value +f_bias (SNR, CRC, streaming_type).

It will be apparent to those skilled in the art that various modifications and variations can be made in the system and method for improved connectivity in GPRS/EGPRS mobile environment for steaming service of the present invention

What is claimed is:

1. A method to select a modulation coding scheme of a mobile device, the method comprising:
   establishing a connection between the mobile device and a remote device through a wireless communication network;
   monitoring at least two measured properties of a radio frequency access link between the mobile device and the wireless communication network;
   selecting an updated derived C value based on the measured properties of the radio frequency access link; and
   inducing a change in a modulation coding scheme based on the updated derived C value,
   wherein when a lower modulation coding scheme is induced, the mobile device also requests a lower grade of service from a streaming server.

2. The method according to claim 1, wherein the measured properties include a signal strength of a broadcast channel.

3. The method according to claim 1, wherein the measured properties include a signal to noise ratio of a traffic channel.

4. The method according to claim 1, wherein the mobile device streams audio and video packet data.

5. The method according to claim 1, wherein the updated derived C value is selected from a look-up table.

6. The method according to claim 1, wherein the updated derived C value is calculated based on one or more of the current traffic burst signal to noise ratio, cyclic redundancy check status, and streaming service type.

7. The method according to claim 1, wherein the updated derived C value is selected from a look-up table based on a signal strength of a broadcast channel and a signal to noise ratio of a traffic channel.

8. The method according to claim 1, further comprising transmitting the updated derived C value to a base station of the wireless communication network.

9. The method according to claim 1, wherein the step of providing an updated derived C value is triggered by the detection of errors in packet data.

10. A mobile device comprising:
    a transceiver that monitors at least two measured properties of a radio frequency access link between the mobile device and a wireless communication network; and
    an application processor that receives the measured properties of a radio frequency access link, provides an updated derived C value based on the measured properties of the radio frequency access link, and instructs the transceiver to transmit the updated derived C value to a base station to induce a change in a modulation coding scheme,
    wherein when a lower modulation coding scheme is induced, the mobile device also requests a lower grade of service from a streaming server.

11. The mobile device according to claim 10, wherein the measured properties include a signal strength of a broadcast channel.

12. The mobile device according to claim 10, wherein the measured properties include a signal to noise ratio of a traffic channel.

13. The mobile device according to claim 10, wherein an application streams audio and video packet data.

14. The mobile device according to claim 10, wherein the updated derived C value is selected from a look-up table.

15. The mobile device according to claim 10, wherein the updated derived C value is calculated based on one or more of the current traffic burst signal to noise ratio, cyclic redundancy check status, and streaming service type.

16. The mobile device according to claim 10, wherein the updated derived C value is selected from a look-up table based on a signal strength of a broadcast channel and a signal to noise ratio of a traffic channel.

17. The mobile device according to claim 10, wherein the transceiver transmits the updated derived C value to a base station of the wireless communication network.

18. The mobile device according to claim 10, wherein determination of the updated derived C value is triggered by detection of errors in packet data.

19. A mobile device comprising:
    a transceiver that monitors at least two measured properties of a radio frequency access link between the mobile device and a wireless communication network; and
    an application processor that receives the measured properties of a radio frequency access link, provides an updated derived value based on the measured properties of the radio frequency access link, and instructs the transceiver to transmit the updated derived value to a base station to induce a change in a modulation coding scheme,
    wherein when a lower modulation coding scheme is induced, the mobile device also requests a lower grade of service from a streaming server.

* * * * *